(12) United States Patent
Hirt et al.

(10) Patent No.: US 7,356,019 B2
(45) Date of Patent: Apr. 8, 2008

(54) METHOD AND APPARATUS FOR CONVERTING OPTICAL SIGNALS TO RADIO CHANNELS

(75) Inventors: Walter Hirt, Wettswil (CH); Fritz Gfeller, Bonstetten (CH); Beat Weiss, Edilbach (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/548,749

(22) PCT Filed: Mar. 8, 2004

(86) PCT No.: PCT/IB2004/000729

§ 371 (c)(1),
(2), (4) Date: Sep. 8, 2005

(87) PCT Pub. No.: WO2004/082163

PCT Pub. Date: Sep. 23, 2004

(65) Prior Publication Data

US 2006/0164271 A1    Jul. 27, 2006

(30) Foreign Application Priority Data

Mar. 12, 2003    (EP)    ................... 03405169

(51) Int. Cl.
*H04B 17/02* (2006.01)

(52) U.S. Cl. ............ 370/347; 370/307; 370/321; 370/533; 375/353; 398/115

(58) Field of Classification Search ........... 370/347, 370/321, 533, 307; 375/353, 219; 398/115
See application file for complete search history.

(56) References Cited

U.S. PATENT DOCUMENTS 5,341,398 A * 8/1994 DeRango et al. ........... 375/213
6,457,178 B1 * 9/2002 Slim .................. 725/127
6,580,531 B1 * 6/2003 Swanson et al. ........... 398/5
6,671,079 B2 * 12/2003 Fuller et al. ............ 359/264
6,952,456 B1 * 10/2005 Aiello et al. ............ 375/295
6,970,448 B1 * 11/2005 Sparrell et al. .......... 370/347
6,980,601 B2 * 12/2005 Jones .................. 375/261
7,164,651 B2 * 1/2007 Weste et al. ............ 370/208

OTHER PUBLICATIONS

Modulations and Protocols for Infra-Red transmission: HW—Server: Authored by Zdenek, Sara.*

* cited by examiner

*Primary Examiner*—Edan Orgad
*Assistant Examiner*—Jay P. Patel
(74) *Attorney, Agent, or Firm*—Robert M. Trepp; F.Chau & Associates, LLC

(57) ABSTRACT

The invention relates to a conversion of a pulse modulated signal to a radio frequency signal enabling use of applications and protocols designed for wireless optical links on radio frequency channels. The method comprises receiving the pulse modulated input signal, decoding the received pulse modulated input signal into a decoded data bit-stream, encoding the decoded data bit-stream into a recoded data bit-stream, under use of the recoded data bit-stream modulating a radio frequency signal, and transmitting the modulated radio frequency signal. In the receiver path a received radio frequency signal is converted to a pulse modulated output signal by the steps of demodulating the received radio frequency signal into a demodulated data bit-stream, decoding the demodulated data bit-stream into a received data bit-stream, encoding the received data bit-stream into a pulse modulated output signal, and forwarding the pulse modulated output signal.

18 Claims, 14 Drawing Sheets

METHOD AND APPARATUS FOR CONVERTING OPTICAL SIGNALS TO RADIO CHANNELS

FIELD OF INVENTION

The present invention relates to a method and apparatus for converting a pulse modulated signal to a radio frequency signal which enable the use of applications and MAC (medium access control) protocols designed for wireless optical links on radio frequency (RF) channels. In particular, the use of various applications and MAC protocols designed for the IrDA® wireless infrared channel (IrDA is a trademark of Infrared Data Association) on the ultra-wideband (UWB) radio frequency (RF) channel is provided.

BACKGROUND

The UWB-RF channel has recently become available in the USA (e.g., in the frequency range 3.1 GHz-10.6 GHz allocated for indoor as well as outdoor use). European and Japanese authorities are preparing similar rules to enable commercial marketing and use of UWB-RF devices.

Short-range wireless technologies in the wireless local area network (WLAN) space as well as the wireless personal and body area network spaces (WPAN/WBAN) continue to proliferate rapidly. In particular, wireless links based on infrared (IR or Ir) light emission have experienced an enormous growth in the recent past owing to ease of use and low cost. The Infrared Data Association (IrDA) has projected a total shipment of 1.3 Billion units by the year 2003, with over 250 Million IrDA devices installed in mobile phones and personal digital assistants (PDAs). This high adoption rate reflects the presence of a large number of IrDA applications in the marketplace and a sizable investment by the industry and users alike. On the other hand, radio-based short-range wireless devices such as Bluetooth™ (Bluetooth is a trademark owned by Bluetooth SIG, Inc.) are also deployed at a rapid pace, thereby reducing the relative size of the IrDA-based market segment rather quickly. This will influence the IR-based industry which is looking for alternate ways to leverage their investments and continue their business.

Two dominant technologies in the short-range wireless space—Bluetooth and IrDA —were specifically designed for replacing short-range wired communication links. Bluetooth is based on an RF technology offering less than 1 Mb/s of user data rate and IrDA offers a number of data rates, e.g., SIR (115 Kb/s), FIR (4 Mb/s), and VFIR (16 Mb/s). IrDA uses optical-IR transmission which requires line of sight (LOS) between transmitter and receiver. IrDA and Bluetooth technologies are also used for consumer-based applications within the single office/home office (SOHO) environment. Each has its own strengths and weaknesses with respect to link range, data rates, required regulation and costs.

While some of these technologies' intended uses and applications overlap, each of the two systems offer all of the hardware and software layers that constitute a set of communication protocols. IrDA is an established and well proven point-to-point, narrow-angle, data-transmission standard that operates at bit rates between 9600 b/s and 16 Mb/s over distances of 0-1 m (mostly 20 cm). It has a wide range of supported hardware and software platforms and is well introduced in the market place. Though IrDA's benefits seem to abound, the technology has its disadvantages. For many applications, its limited range and pointing angle is rather inconvenient and its optical signals fail to penetrate walls or propagate around obstructions (IrDA was not designed to rely on diffused optical signal propagation). Additionally, IrDA devices must be nearly stationary to achieve synchronization with other IrDA devices (narrow optical beam). Where IrDA fails to be user friendly, radio-based systems offer advantages, such as non-line-of-sight (NLOS) transmission through walls and other obstructions. However, many RF-based systems, such as Bluetooth, are regulated differently in various countries worldwide and thus suffer non-trivial insertion into the markets.

The two main markets for short-range wireless devices are the portable and desktop computing and handheld markets. Due to architectural and range constraints, the level of adoption of IrDA in the desktop space has been relatively low. Current desktop designs in the marketplace are more appropriate for placing the desktop in a cabinet or on the floor. However, such a usage scenario is not favorable for point-and-shoot optical link applications as offered by IrDA.

The disadvantages of optical-IR communication links and the investments from the manufacturers and the user community in IrDA-based technology and applications could both be leveraged and maintained into the future by replacing or enhancing the optical transceiver of the IrDA system (i.e., part of the PHY layer) with a suitable radio-based transceiver.

Given the recent introduction of a license-free spectrum band between 3.1 GHz and 10.6 GHz (USA/FCC) for UWB radio devices, a new and inherently compatible radio technology has become available to design and implement such radio-based systems. As a result, the many applications and protocol stacks, including medium access control protocols, originally conceived for wireless optical links should be useable on the UWB radio channel.

It would be advantageous if the two types of communication systems could be brought together to make use of the wireless optical system and the radio channel. Owing to the different transmission media used (optical and radio frequency, respectively) as well as because of legacy considerations, these different wireless communication systems have traditionally also been designed with different medium access control (MAC) mechanisms; in addition, their positioning in the market place have been different in general, although their applications do overlap in certain areas (e.g., PDA data base synchronization with PC data base).

SUMMARY AND ADVANTAGES OF THE INVENTION

In accordance with the present invention there is provided a method for converting a pulse modulated input signal to a radio frequency signal. The radio frequency signal can be a pulsed radio frequency signal, as it is used in connection with ultra-wideband (UWB) radio frequency (RF) signals. The method comprises the steps of receiving the pulse modulated input signal; decoding the received pulse modulated input signal into a decoded data bit-stream; encoding the decoded data bit-stream into a recoded data bit-stream; modulating a radio frequency signal with the recoded data bit-stream; and transmitting the modulated radio frequency signal.

The method further allows a conversion of a received radio frequency signal to a pulse modulated output signal by the steps of demodulating the received radio frequency signal into a demodulated data bit-stream; decoding the demodulated data bit-stream into a received data bit-stream;

encoding the received data bit-stream into a pulse modulated output signal; and forwarding the pulse modulated output signal.

It is also possible to directly modulate the radio frequency signal under use of the decoded data bit-stream which would reduce circuitry.

Moreover, it is also possible to directly modulate the radio frequency signal under use of the received pulse modulated input signal by polarity modulation, also referred to as 180° phase modulation. This would even more simplify the circuitry.

The pulse modulated input signal can be received from an optical controller thereby a developed optical signal specification can be used.

The radio frequency signal can be amplified. This allows a broader broadcast range thereby reaching devices further away from a transmit place.

The pulse modulated input signal can be based on the IrDA specification and the radio frequency signal comprises an ultra-wideband (UWB) signal. Also possible is that the pulse modulated output signal is adapted to the IrDA specification and the received radio frequency signal bases on an ultra-wideband (UWB) signal specification.

The pulse modulated input signal can be an optical signal that is converted to an electrical signal for charging a battery used to operate a transverter. This allows supporting the power supply (battery) of a mobile device. IrDA protocols in combination with UWB-RF transverters can potentially be implemented such that the required battery power is lower than that of conventional optical IrDA devices. The reason is that UWB devices emit only micro-watt RF power levels while optical devices emit up to the milliwatt level and beyond.

In another aspect of the invention there is provided a transverter for converting a pulse modulated input signal to a radio frequency signal. This apparatus comprises a signal decoder unit for decoding the pulse modulated input signal into a decoded data bit-stream; a data encoder unit for encoding the decoded data bit-stream into a recoded data bit-stream; and a radio frequency modulator which under use of the recoded data bit-stream modulates a radio frequency signal.

The transverter for further converting a received radio frequency signal to a pulse modulated output signal comprises a demodulator unit for demodulating the received radio frequency signal into a demodulated data bit-stream; a data decoder unit for decoding the demodulated data bit-stream into a received data bit-stream; and a signal encoder unit for encoding the received data bit-stream into the second pulse modulated signal.

The transverter for converting a pulse modulated input signal to a radio frequency signal and converting a received radio frequency signal to a pulse modulated output signal can be implemented as a transceiver. It is also possible to use the means for converting a received radio frequency signal to a pulse modulated output signal as described above within a single device that is a receiver.

The transverter can comprise an optical transceiver and an optical window which attenuates an optical signal received and/or sent by the optical transceiver. This would allow an easy close spatial coupling without further modifications.

The transverter can be part of a mobile device, e.g., an electronic watch, using the IrDA protocol specification.

In general, the method and apparatus allow the use of the existing large base of applications and optical or IrDA protocol stack (medium access control) through suitable conversion circuits on future based wireless links, particularly those based on license-free UWB radio links.

Further, the use of IrDA devices can be expanded to non-directional (non-line-of-sight) communication links while maintaining the security advantages of optical IrDA communication, since UWB radio signals are inherently difficult to detect (very low power spectral density, e.g., less than 75 nW/MHz according to the FCC's specifications).

The total system development costs and thus user expenses can be kept low because there is no need for a new development of a communication specification or entirely new standard. The UWB-RF mode can be integrated into the existing standard.

The UWB-RF mode added to IrDA allows users to connect to other devices over link distances significantly beyond IrDA's fundamental 1 m limit, and also to establish links across a wall (which optical signals cannot penetrate) and around obstacles.

UWB-RF mode added to IrDA allows users to transmit at the same time to a number of different clients (one-to-many broadcast), instead of using the one-to-one infrared narrow beam that is typical for IrDA. In such applications and with transmitting devices equipped with both optical and radio ports, it would be possible to transmit either simultaneously or alternately through the optical port and/or the radio port, thereby extending the covering area of the transmission.

The advanced infrared (AIr) system developed at the IBM Zurich Research Laboratory is a proposed optical IrDA standard for indoor multipoint-to-multipoint connectivity. The distance and data rate are variable ranging from 250 kb/s over 8 m to 4 Mb/s over 4 m. It is designed for cordless connections to multiple peripherals and meeting room collaboration applications. The AIr link protocol, medium access control as well as part of the physical layer functions (e.g., encoding and decoding) are well suited for UWB-RF devices; the variable data rate feature of AIr based on repetition coding is particularly advantageous for the UWB-RF channel.

UWB-RF transverters can also be applied to extend the use of wired standard connections, such as Ethernet or Universal Serial Bus (USB).

SHORT DESCRIPTION OF FIGURES

Preferred embodiments of the invention are described in detail below, by way of example only, with reference to the following schematic drawings.

FIG. 3a shows a table with signaling rate and pulse duration specifications of a prior art wireless optical communication system; the particular table describes IrDA's wireless infrared system.

FIG. 3b shows an example of pulse modulated waveforms for a prior art wireless optical communication system (IrDA) for certain signaling rates according to the table shown in FIG. 3a.

FIG. 10 shows an illustration of typical transmitter signals A-E indicated in FIGS. 7 and 9a.

Figure 12A:
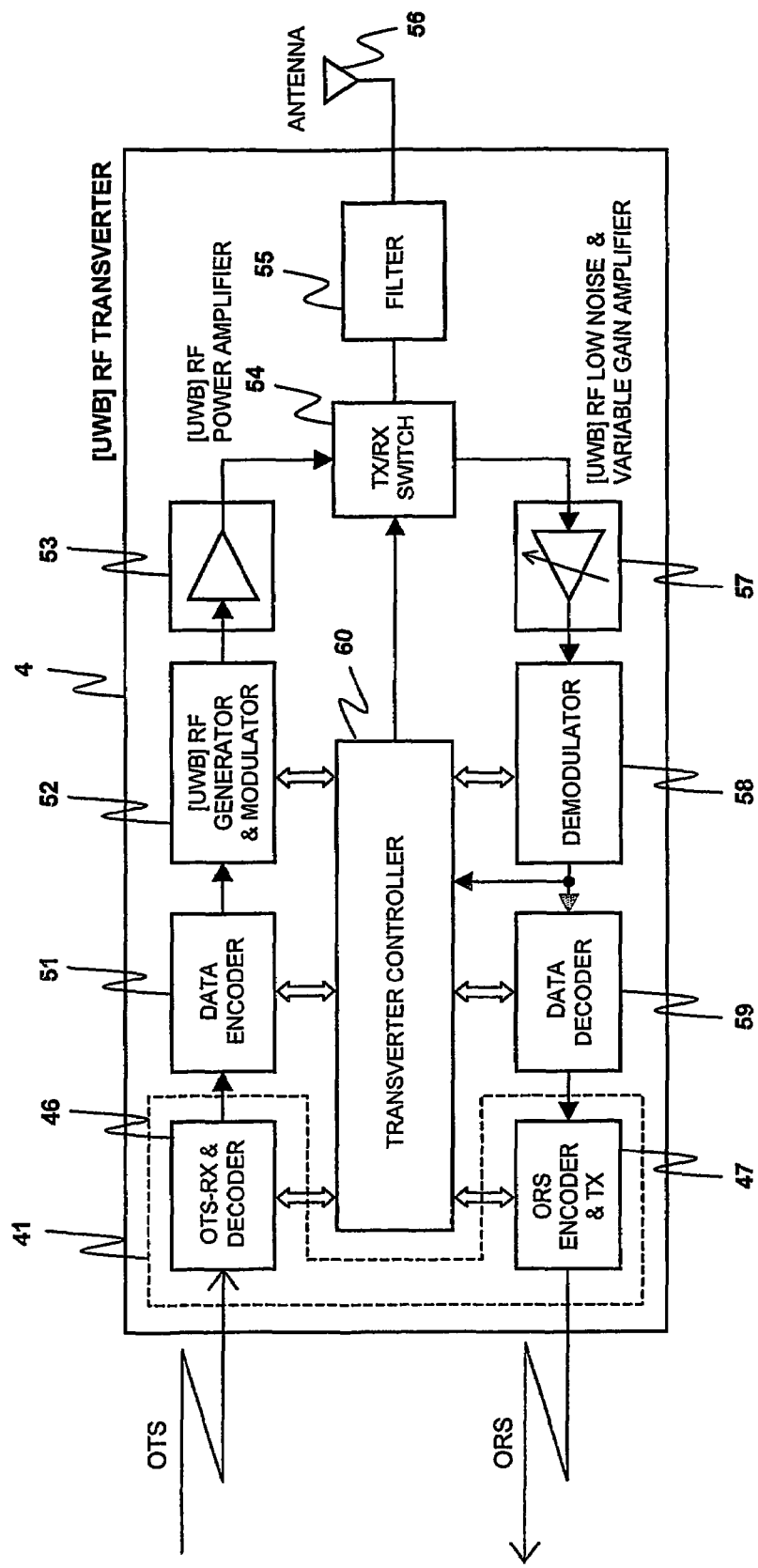
FIG. 12a shows an alternate embodiment of the ultra-wideband (UWB) radio frequency (RF) transverter comprising a data converter that includes an optical transmitted signal (OTS) receiver and decoder and an optical received signal (ORS) encoder and transmitter.
Figure 12B:
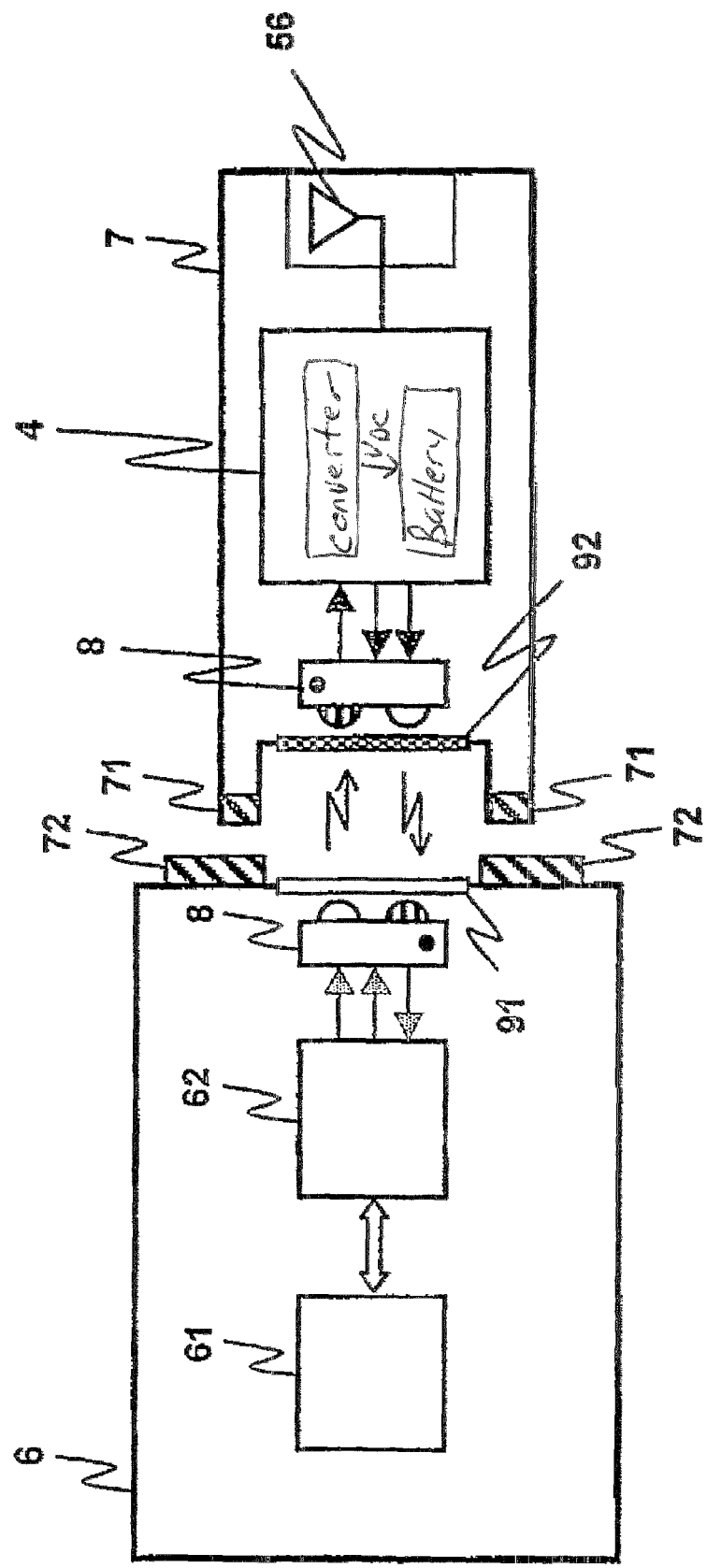

FIG. 12b shows an illustration of an apparatus of a wireless converter based on the ultra-wideband (UWB) radio frequency (RF) transverter that connects through an optical interface port (e.g., IrDA compliant) with a host platform that comprises an optical transceiver, a controller executing the optical link protocol, and a host (or client) application that makes use of the link provided by the wireless converter.

Figure 13B:
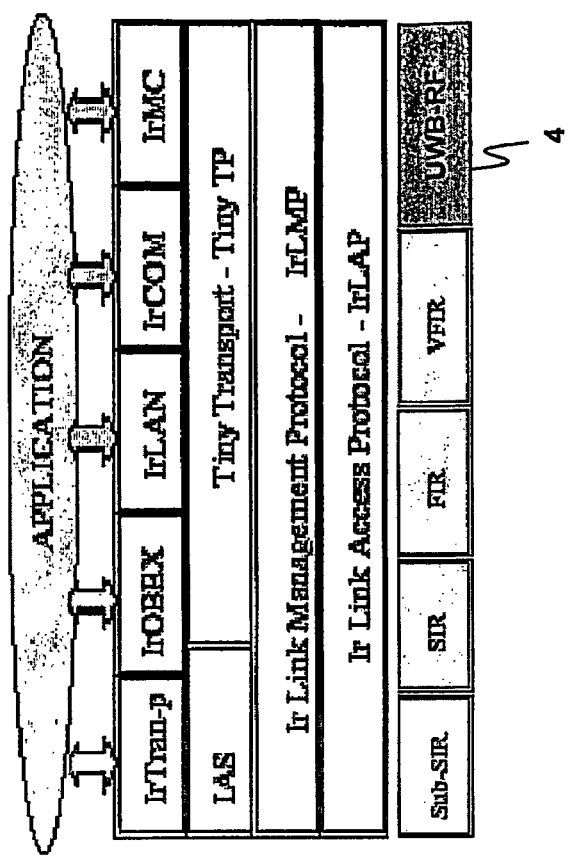
Figure 13A:
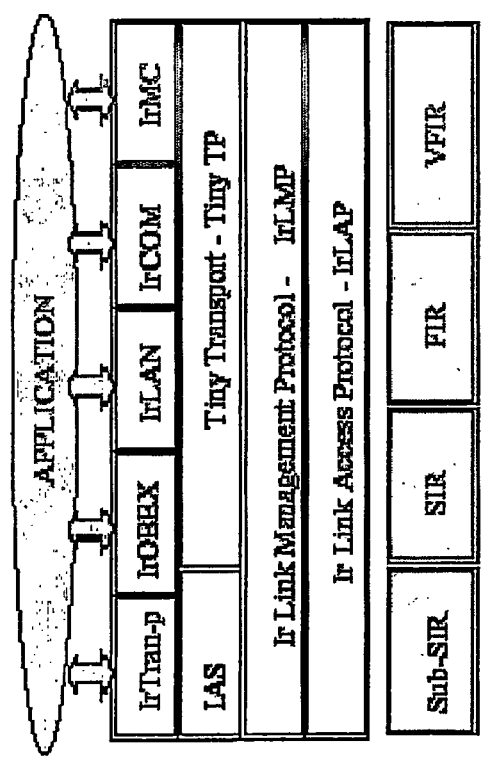

FIG. 13a shows an illustration of the IrDA protocol stack and its native communication modes (optical): Sub-SIR, SIR, FIR, and VFIR.

FIG. 13b shows an illustration of the IrDA protocol stack, its native optical communication modes (Sub-SIR, SIR, FIR, and VFIR), and an additional radio mode enabled by an UWB-RF transverter.

The drawings are provided for illustrative purposes only and do not necessarily represent practical examples of the present invention to scale.

DESCRIPTION OF PREFERRED EMBODIMENTS

Figure 1:
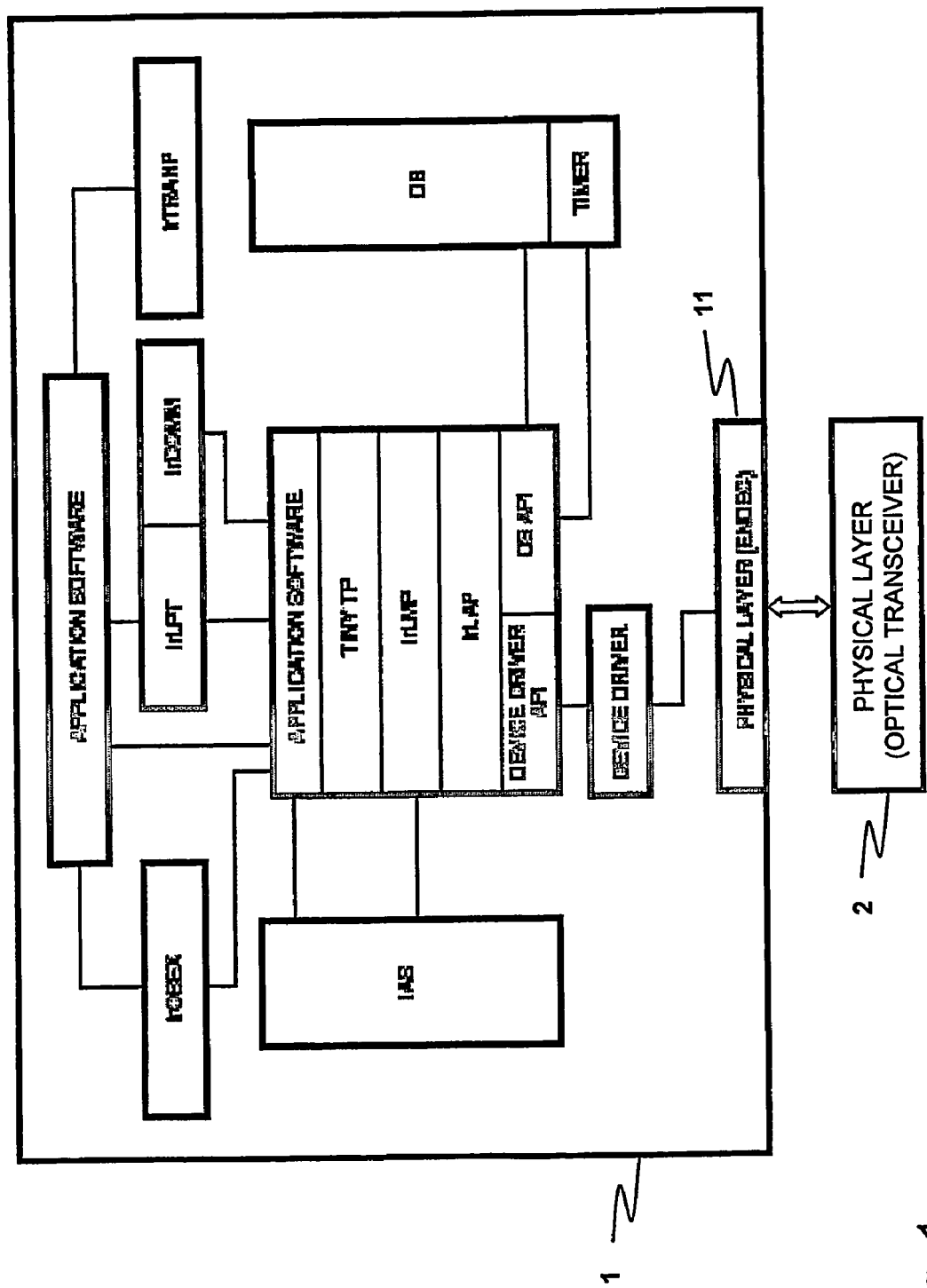
FIG. 1 shows prior art of a wireless optical communication device comprising an application and protocol stack—also referred to as optical (infrared) controller—and an optical transceiver that is part of the physical layer.
Figure 2A:
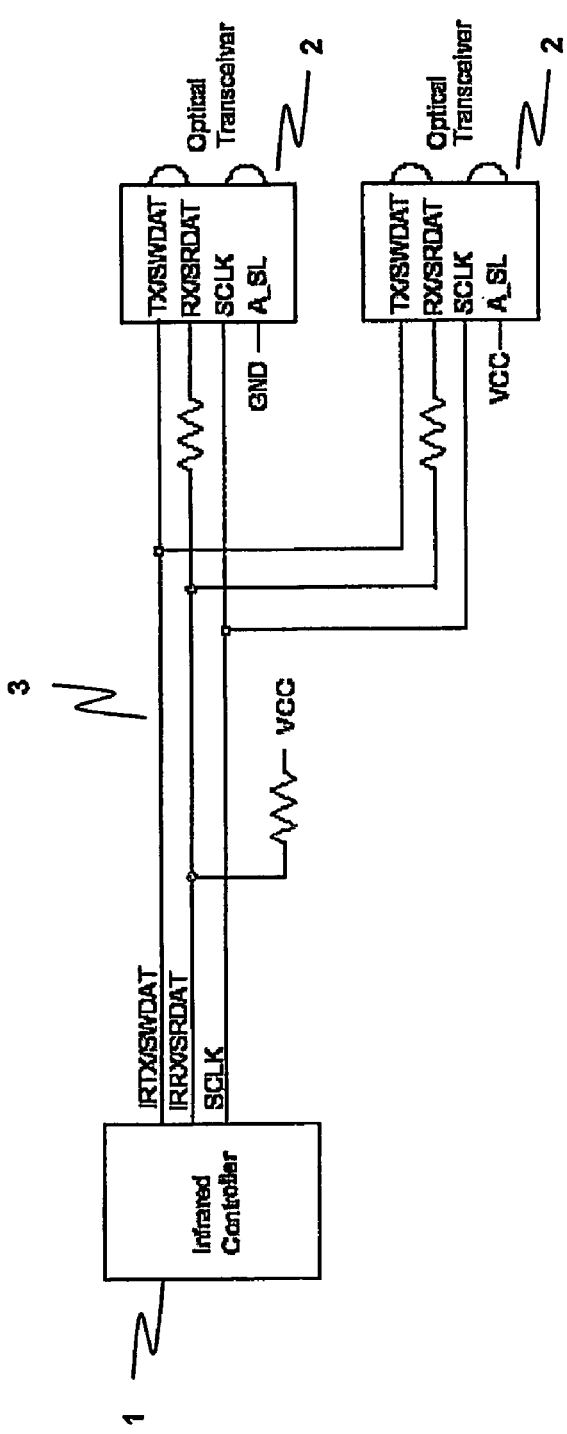
FIG. 2a shows a prior art electrical interface connection between an optical (infrared) controller and two optical transceivers.
Figure 2B:
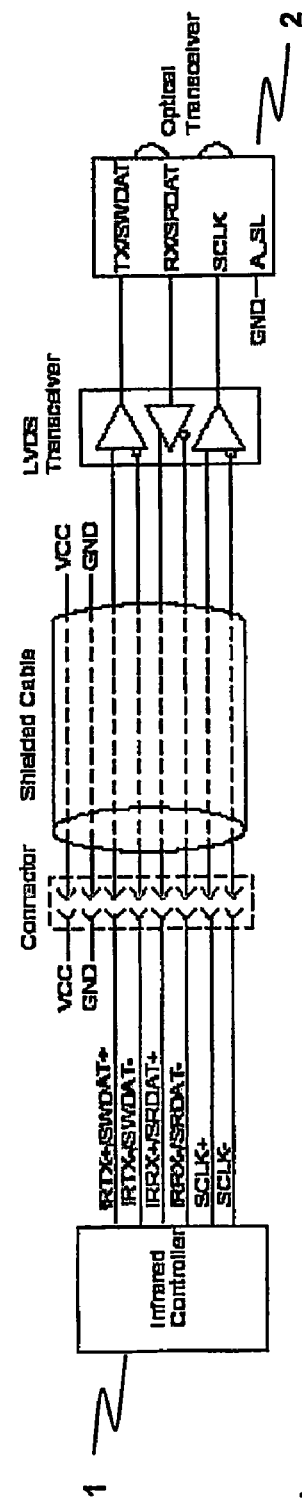
FIG. 2b shows an alternate prior art electrical interface connection between an optical (infrared) controller and one optical transceiver.
Figures 3A, 3B:
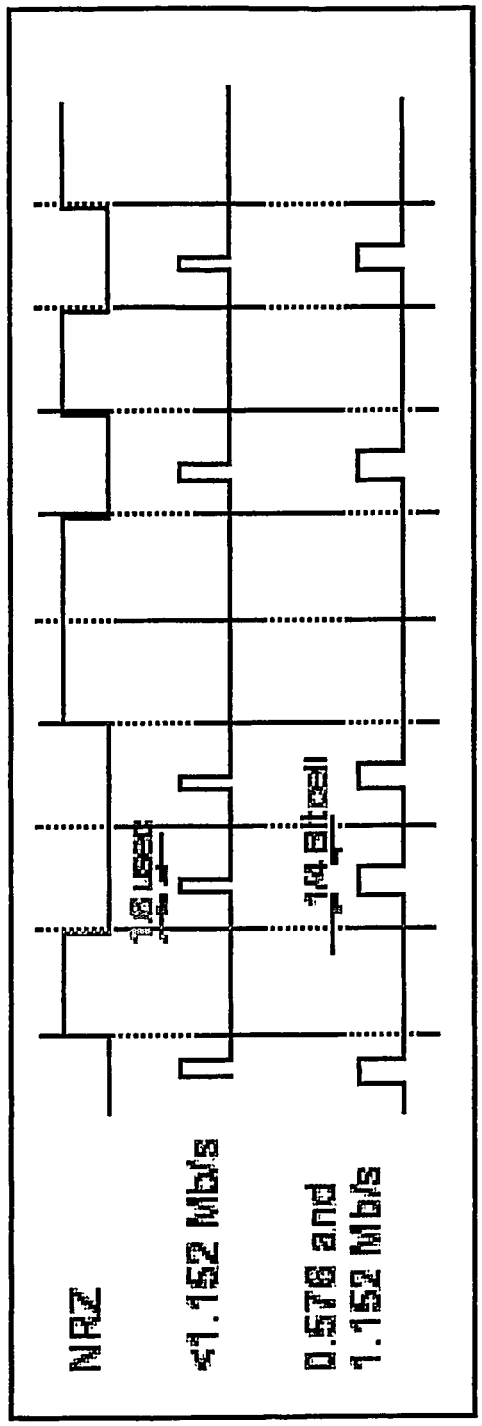

FIGS. 1 to 3 illustrate the prior art IrDA system based on optical narrow-beam communication over distances of up to one meter. In particular, FIG. 1 shows that the physical layer system can be separated into two parts, a first part called ENDEC (encoder/decoder) 11 that belongs to the protocol stack within an optical (infrared) controller 1, and a second part called optical transceiver 2. The same reference numbers are used within the description to denote the same parts or alike. FIG. 2a indicates a prior art electrical interface connection 3 between the optical (infrared) controller 1 and two optical transceivers 2, and FIG. 2b shows an alternate prior art electrical interface connection 3 between the optical (Infrared) controller 1 and one optical transceiver 2. The table in FIG. 3a shows signaling rate and pulse duration specifications of a prior art wireless optical communication system; the particular table describes IrDA's wireless infrared system. FIG. 3b shows various modulation modes and associated signals as specified by the IrDA standard; specifically, the pulse-like signals that are typical for optical communication can be noticed. The pulse-like optical modulation signal features can be directly used in an advantageous manner when converting these signals to similar pulsed UWB-RF signals.

Figure 4:
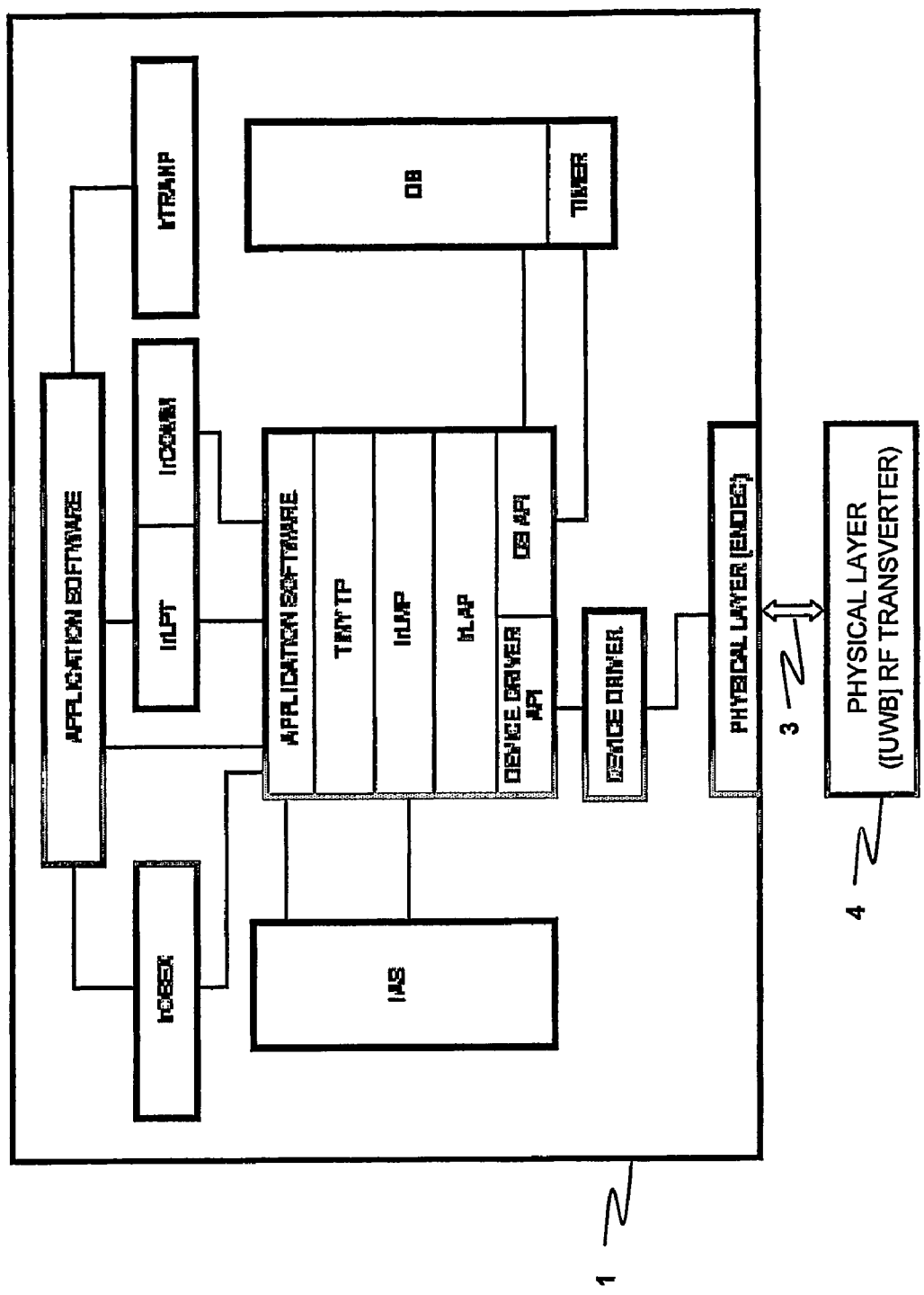
FIG. 4 shows a wireless radio frequency (RF) communication device comprising an optical (infrared) controller, an electrical interface connection, and a [ultra-wideband (UWB)] radio frequency (RF) transverter.
Figure 5A:
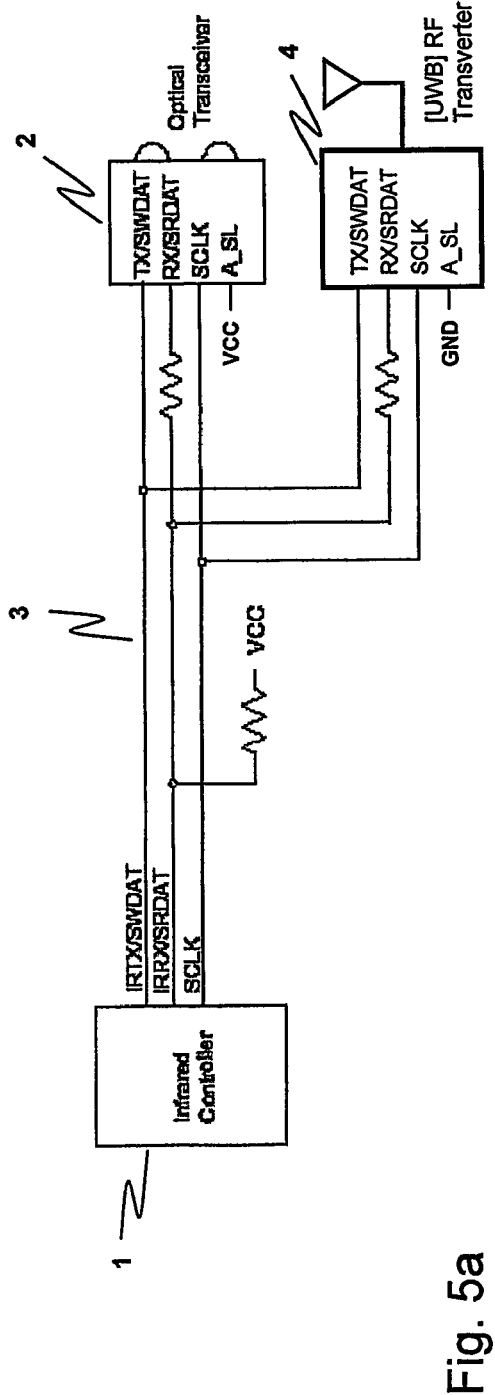
FIG. 5a shows a prior art electrical interface connection between an optical (infrared) controller and a prior art optical transceiver as well as a wireless [ultra-wideband (UWB)] radio frequency (RF) transverter.
Figure 5B:
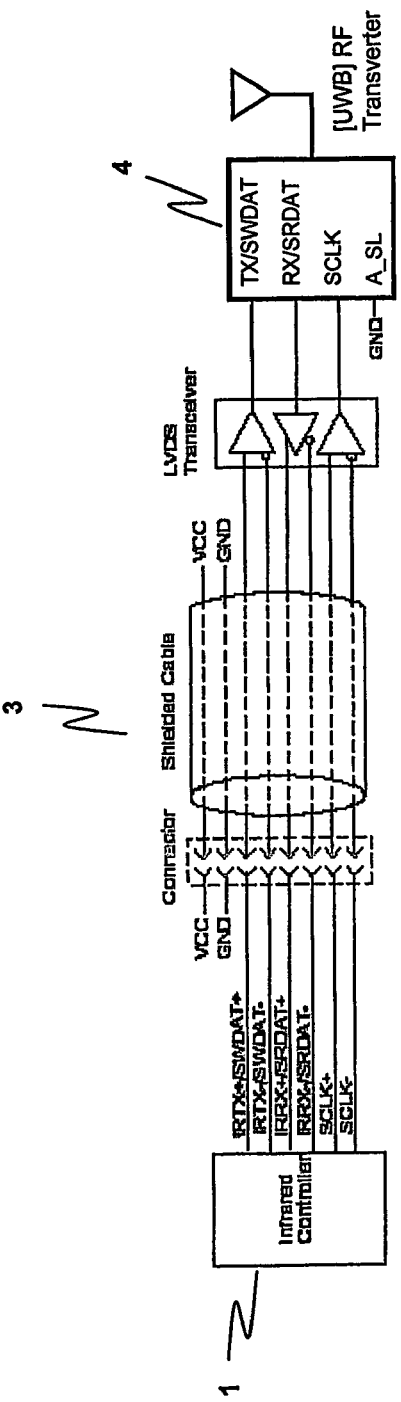
FIG. 5b shows an alternate prior art electrical interface connection between an optical (infrared) controller and the wireless [ultra-wideband (UWB)] radio frequency (RF) transverter.
Figure 6A:
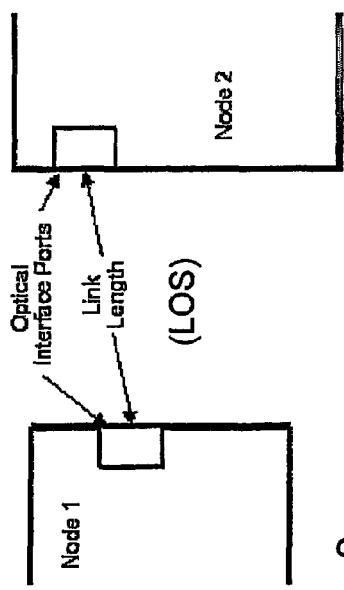
FIG. 6a shows a prior art line-of-sight (LOS) wireless optical link configuration between two optical interface ports.
Figure 6B:
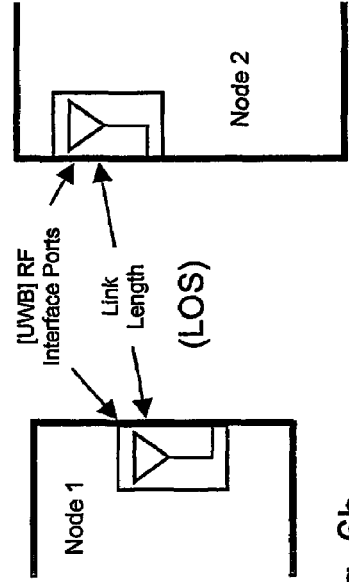
FIG. 6b shows a line-of-sight (LOS) wireless link configuration between two radio frequency (RF) interface ports according to the current invention.
Figure 6C:
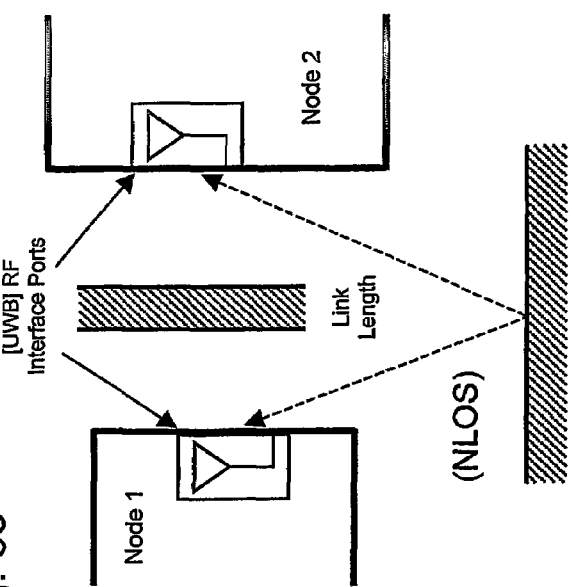
FIG. 6c shows a non-line-of-sight (NLOS) wireless link configuration between two radio frequency (RF) interface ports according to the current invention.
Figure 6D:
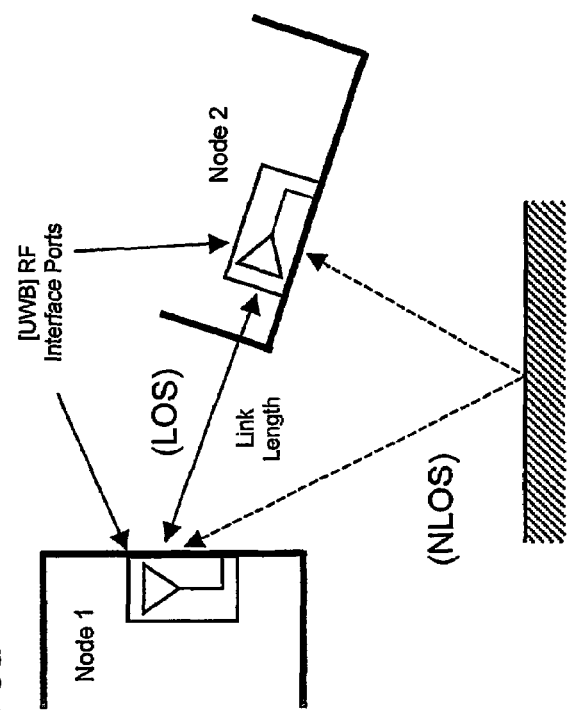
FIG. 6d shows a simultaneous non-line-of-sight (NLOS) and line-of-sight (LOS) wireless link configuration between two radio frequency (RF) interface ports.

FIG. 4 shows how the system illustrated by FIGS. 1 to 3 can be converted into a wireless radio frequency (RF) communication device comprising the optical controller 1 and a wireless [ultra-wideband (UWB)] RF transverter 4 connected by the electrical interface connection 3. The wireless [ultra-wideband (UWB)] RF transverter 4 is also referred to as [UWB] RF or RF transverter 4. The concept introduced with reference to FIG. 4 is further illustrated in FIG. 5a, by means of the electrical interface connection 3 between the optical (infrared) controller 1 and the optical transceiver 2 as well as the wireless [ultra-wideband (UWB)] RF transverter 4. FIG. 5b shoes an alternate embodiment with the electrical interface connection 3 between the optical (infrared) controller 1 and the wireless [ultra-wideband (UWB)] RF transverter 4.

FIG. 6 illustrates some of the usage advantages. In particular, FIG. 6a shows a prior art line-of-sight (LOS) wireless optical link configuration between two optical interface ports, for example, IrDA compliant (narrow-beam) optical ports. The same mode can be implemented with LOS wireless radio link configurations between two RF interface ports as illustrated in FIG. 6b; the advantage in this case is that the RF signal's beam is essentially omni-directional, such that exact pointing of the devices is not necessary, as would be the case with an optical link. FIG. 6c shows a non-line-of-sight (NLOS) radio link configuration between two RF interface ports, while FIG. 6d illustrates a simultaneous NLOS and LOS radio link configuration between two RF interface ports.

Figure 7:
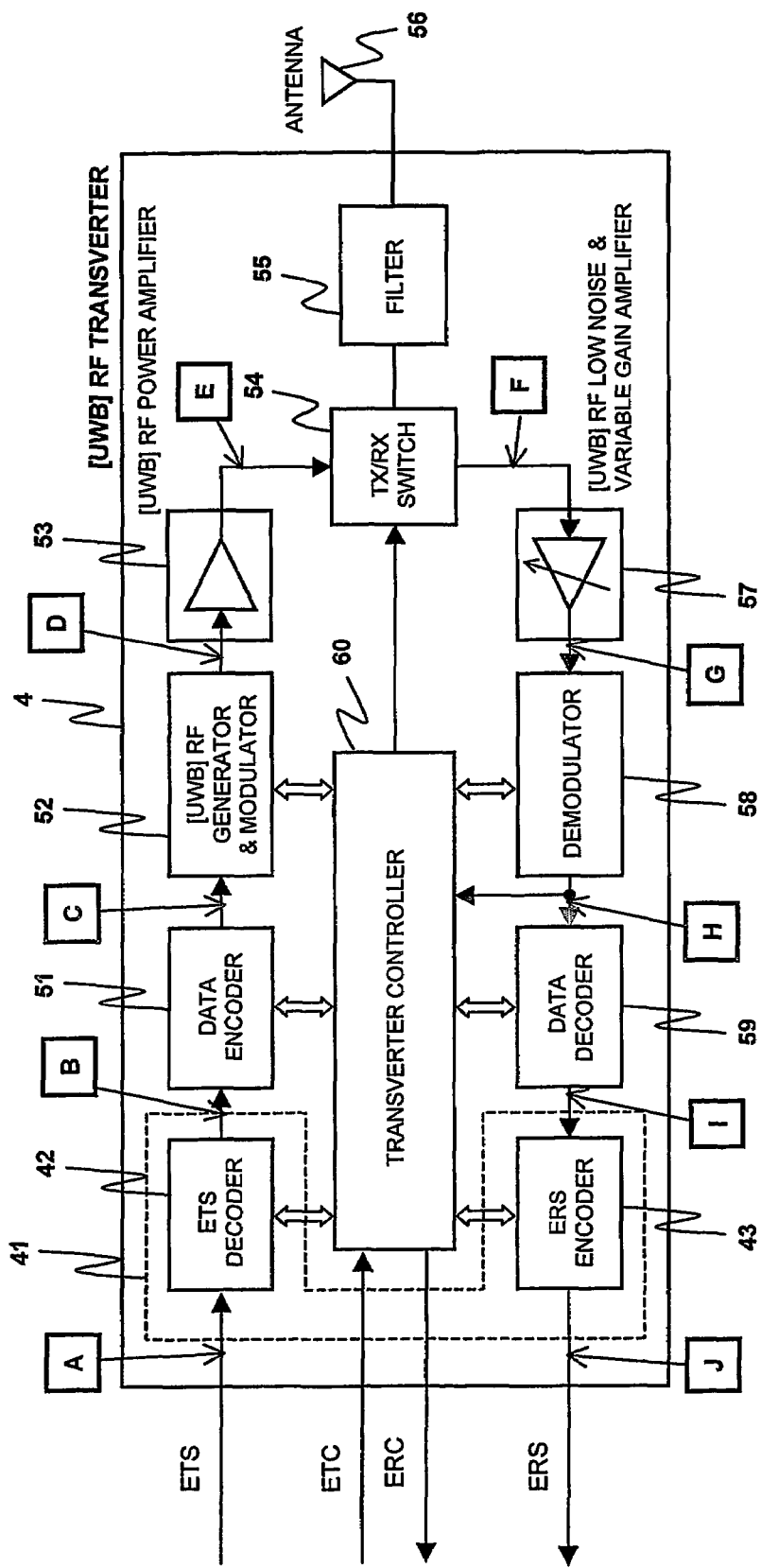
FIG. 7 shows an ultra-wideband (UWB) radio frequency (RF) transverter comprising a data converter that includes an electrical transmitted signal (ETS) decoder and an electrical received signal (ERS) encoder using a single filter for transmitter (TX) and receiver (RX).

FIG. 7 illustrates a preferred general architecture of the [ultra-wideband (UWB)] RF transverter 4 comprising a data converter 41 that includes here an electrical transmitted signal (ETS) decoder 42, also referred to as signal decoder unit 42, and an electrical received signal (ERS) encoder 43, also referred to as signal encoder unit 43, using a single filter 55 for transmission and reception. The output of the ETS decoder 42 feeds the transmitter path of the RF transverter 4, comprising the functions of a data encoder unit 51, followed by an [UWB] RF generator and modulator 52 that is also regarded as a radio frequency modulator 52, and a [UWB] RF power amplifier 53. The generic notion of a "power amplifier" is used although it is understood that specific UWB-RF signals are very low-power signals by their very definition. The amplifier's 53 output is fed to a transmit/receive (TX/RX) switch 54 that feeds the signal to the single filter 55; the latter is connected to an antenna 56 for emission of an RF signal. The data encoder unit 51 receives the decoded data stream from the ETS decoder 42 and introduces a new modulation signal that is suited for transmission over the RF channel. Similarly, the receiver path of the [UWB] RF transverter 4 operates in the reverse order, where the TX/RX switch 54 delivers a received radio frequency signal F to an RF low noise/variable gain circuit 57 for amplification and amplitude level adjustment. The output of this circuit 57 is fed to a demodulator unit 58 which in general extracts the baseband signal from the RF signal G applied to its input. The demodulator unit 58 feeds the data decoder 59, which in turn delivers the decoded data to the ERS encoder 43. The functional block called transverter controller 60 coordinates, receives and outputs all necessary control and timing (clock) signals interfacing to the various functions of the transverter 4. The electrical interface signals ETS, ETC, ERC, and ERS, as indicated at the inputs and outputs of the transverter 4, respectively, are understood to be part of a general electrical interface connection 3; for example, these signals connect to the optical (infrared) controller 1 which is either an IrDA compliant controller, an Air compliant controller, or an IRGATE compliant controller.

Signals A to J are indicated in FIG. 7 and will be shown in more detail with reference to FIGS. 9b to 11 and described below.

In operation the [UWB] RF transverter 4 converts a pulse modulated input signal A, also labeled as ETS, to a radio frequency signal D or E which is also contemplated as modulated radio frequency signal D or amplified modulated radio frequency signal E, respectively. For that, the ETS decoder 42 decodes the received pulse modulated input signal A into a decoded data bit-stream B. Then, the data encoder unit 51 encodes the decoded data bit-stream B into a recoded data bit-stream C. The radio frequency modulator 52 modulates under use of the recoded data bit-stream C the radio frequency signal D which can be amplified by the [UWB] RF power amplifier 53 to the amplified modulated radio frequency signal E. The amplified modulated radio frequency signal E is finally sent via the transmit/receive (TX/RX) switch 54 and the single filter 55 to the antenna 56.

In the receive path, the [UWB] RF transverter 4 converts a received radio frequency signal F, G to a restored or pulse modulated output signal J. The received radio frequency signal F, G is received via the antenna 56, the single filter 55, and the transmit/receive (TX/RX) switch 54. As mentioned above, the received radio frequency signal F is feed to the RF low noise/variable gain circuit 57 for amplification and amplitude level adjustment. This circuit 57 outputs the RF signal G which is fed to the demodulator unit 58 for demodulating the RF signal G into a demodulated data bit-stream H. The data decoder unit 59 decodes then the demodulated data bit-stream H into a received data bit-stream I. Finally, the signal encoder unit 43 encodes the received data bit-stream I into the pulse modulated output signal J which then can be forwarded as ERS signal on the electrical interface connection 3.

Figure 8:
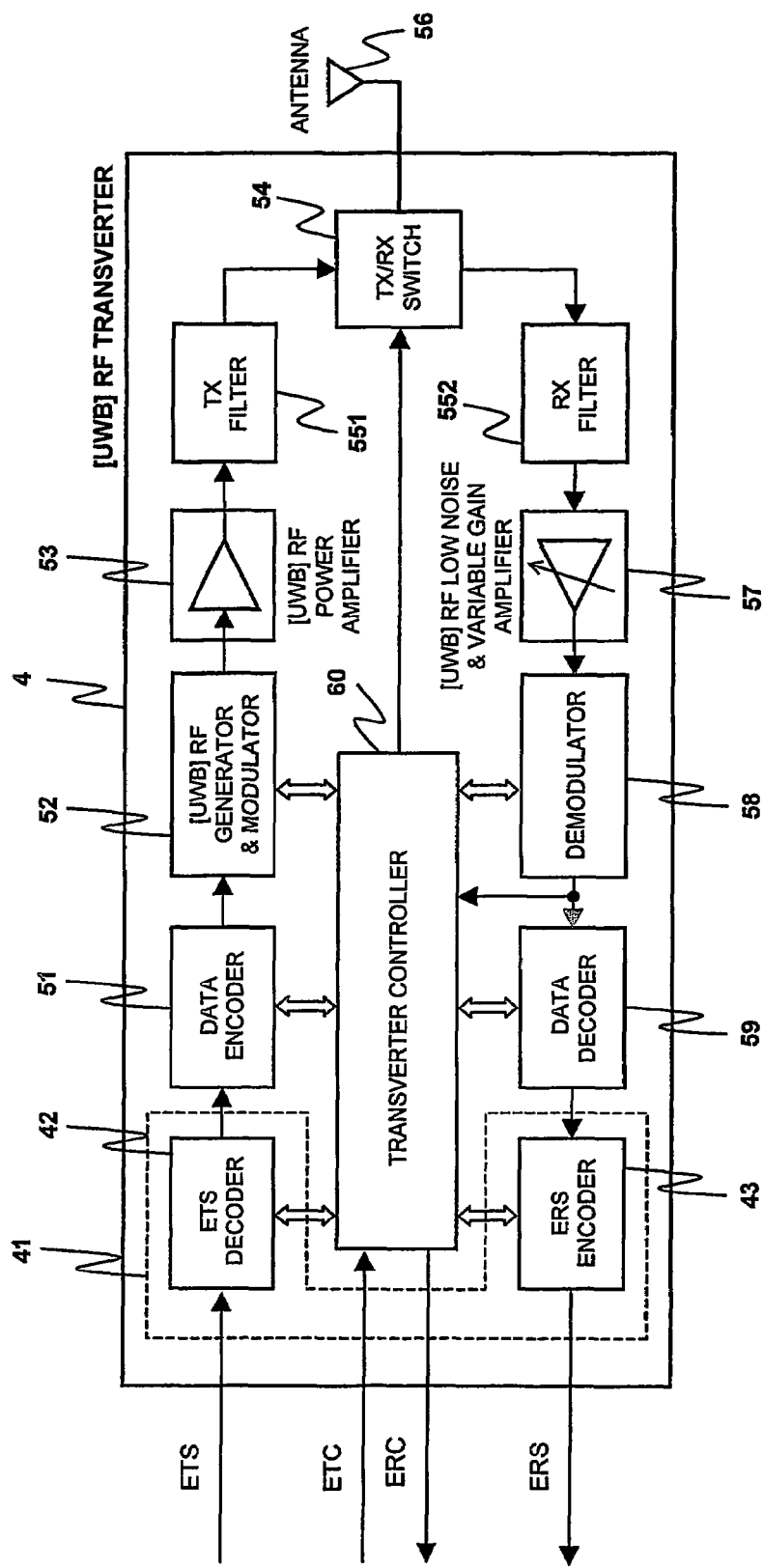
FIG. 8 shows another ultra-wideband (UWB) radio frequency (RF) transverter comprising a data converter that includes an electrical transmitted signal (ETS) decoder and an electrical received signal (ERS) encoder using two separate filters for transmitter (TX) and receiver (RX), respectively.

FIG. 8 illustrates an alternate general architecture of the [ultra-wideband (UWB)] RF transverter 4 as was described above. The difference in this embodiment is that two separate filters 551, 552 for transmission (TX) and reception (RX) are being used. Such an arrangement may be advantageous, for example, when there is a need to apply different design criteria to the transmitter and receiver paths of the RF transverter 4. Typically, the TX filter 551 may need to be optimized jointly with the antenna characteristics for the proper shaping of the emitted signal spectrum according to regulatory requirements. On the other hand, the RX filter 552 is usually used to match the input characteristics of the RF low noise/variable gain circuit 57 to minimize the receiver's noise figure and thus to optimize the system's error rate performance. Alternatively, different TX and RX filters could be used because transmit and receive signals are designed to use different RF bands.

In the context of this disclosure, it is assumed that the transverter 4, for example as shown in FIG. 9 and described below emits and receives signals as specified in the FCC's First Report and Order document, ET Docket 98-153, FCC 02-8, adopted on Feb. 14, 2002, and released on Apr. 22, 2002; therein, it is defined that UWB radio devices are devices generating signals with a fractional emission bandwidth of 0.2 (i.e., 20%) below 2.5 GHz or an absolute minimum bandwidth of 500 MHz above 2.5 GHz, whichever applies. This and other related assumptions are only exemplary for the definition of UWB radio devices; in the future, similar definitions for UWB radio devices may be introduced by other regulatory bodies, e.g., in Europe or Asia, or existing definitions and specifications may be modified in the future.

Figure 9A:
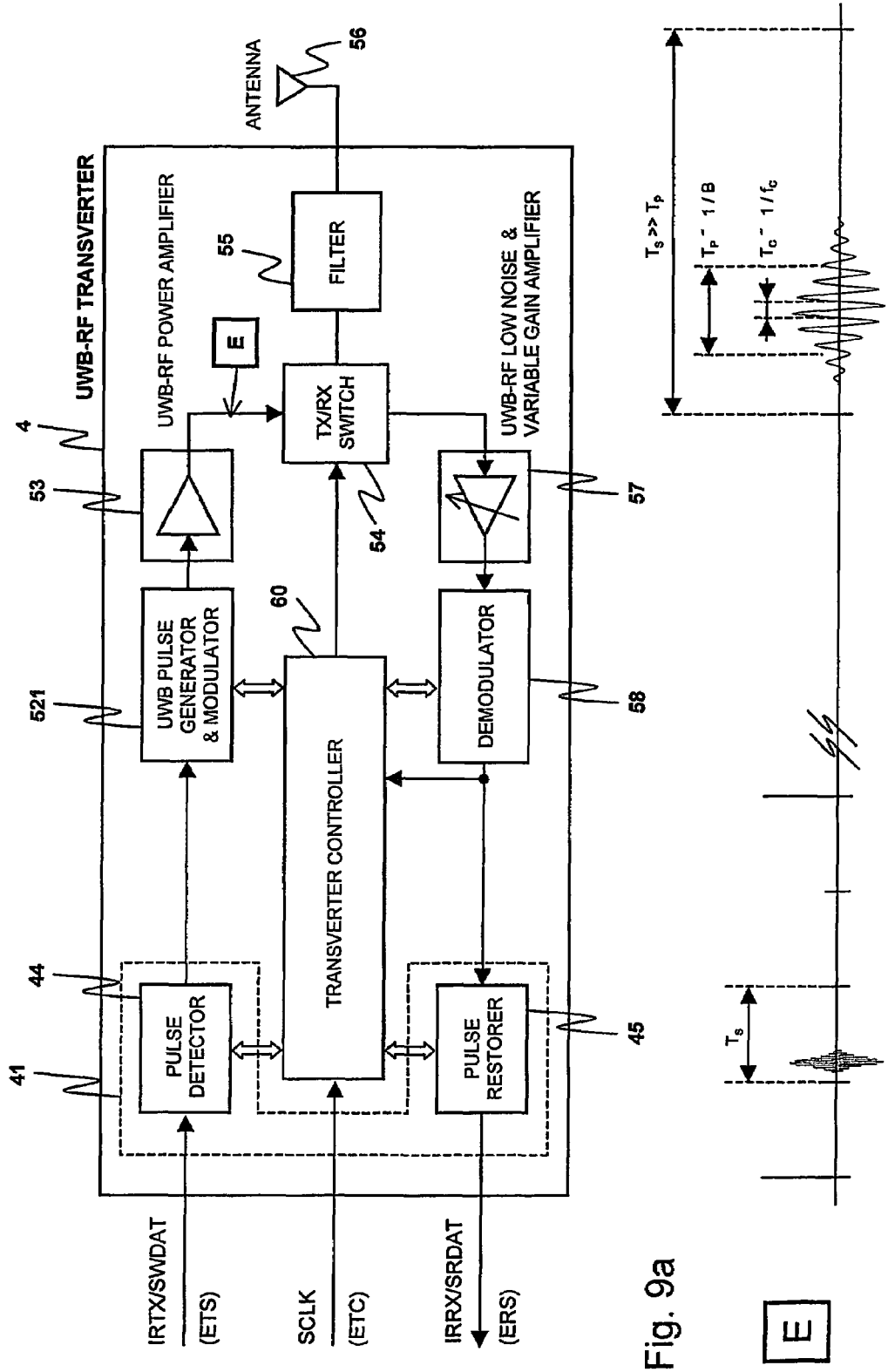
FIG. 9a shows yet another ultra-wideband (UWB) radio frequency (RF) transverter comprising a data converter that includes an electrical transmitted IrDA (IRTX/SWDAT) pulse decoder and an electrical received IrDA (IRRX/SRDAT) pulse restorer using a single filter for transmitter (TX) and receiver (RX).
Figure 9B:
FIG. 9b shows an illustration of signal E at the output of an UWB-RF power amplifier.

FIG. 9a shows an example of a specific UWB-RF transverter 4 comprising the data converter 41 that here includes an electrical transmitted IrDA (IRTX/SWDAT) pulse decoder 44 and an electrical received IrDA (IRRX/SRDAT) pulse restorer 45. The output of the pulse detector 44 feeds directly the transmitter path of the UWB-RF transverter 4 comprising the functions of an UWB pulse generator and modulator 521 and the UWB-RF power amplifier 53. The latter's output is fed to the TX/RX switch 54 that feeds the signal to filter 55 whose output is connected to the antenna 56. The data encoder unit 51 previously shown in FIG. 7, for example, is not used in this scheme, since the detected pulses received from the output of pulse detector 44 are directly used to control an UWB pulse generator/modulator 521, also referred to as modified radio frequency modulator 521. This generator/modulator 521 can modulate the radio frequency signal, e.g., by binary polarity modulation or more general multilevel modulation. Similarly, the receiver path of the UWB-RF transverter 4 operates in the reverse order, where the TX/RX switch 54 delivers the received signal to an RF low noise/variable gain amplifier 57 for received signal amplification and amplitude adjustment. The output of this circuit is fed to the demodulator unit 58 which extracts the baseband signal from the RF signal applied to its input; typically, the demodulator unit 58 can be implemented as a simple envelope detector or a more efficient direct RF-pulse detector.

It has been shown, that efficient direct pulse detectors can be implemented by making use of the specific properties of nonlinear circuit elements, such as tunnel diodes. Similarly, nonlinear circuit elements can be used to generate UWB-RF signals. A pulse-driven method applied to UWB is shown in "Cellonics™ UWB, The Future of Wireless Now, A White Paper", (MWP-01), by Cellonics Inc Pte Ltd, page 11 (Cellonics™ is a trademark of Cellonics Inc).

The demodulator unit 58 in FIG. 9a feeds directly a pulse restorer 45. The functional block called transverter controller 60 coordinates, receives and outputs all necessary control and timing (clock) signals interfacing to the various functions of the RF transverter 4. The latter interfaces directly to the IrDA compliant electrical interface connection 3, as shown in FIG. 2. For illustration, FIG. 9b indicates the typical shape of signal E at the output of the UWB-RF power amplifier 53. Here, $T_s$ is the slot or symbol interval, $T_P$ is the (effective) pulse width—whose inverse value indicates approximately the resulting spectral bandwidth B of the signal—and $T_c$ represents approximately one period of the spectrum's center frequency $f_c$.

Figure 10:
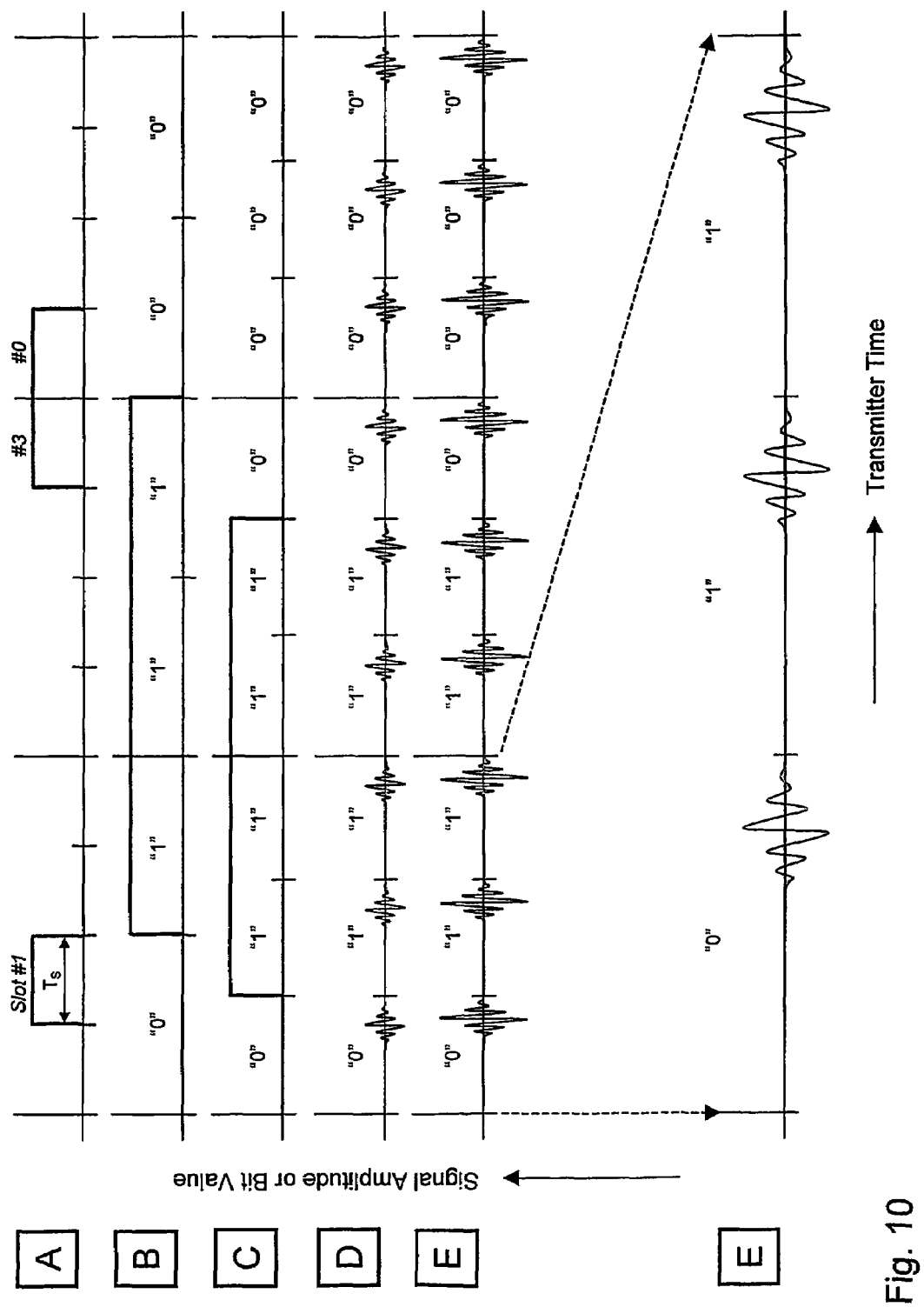

FIG. 10 illustrates typical signal forms, A to E, at the different transmitter positions within the RF transverter 4 shown in FIG. 7. In particular, this illustration indicates that $T_s$, the slot or symbol interval as determined by the IrDA system, is typically large enough to avoid inter-pulse interference (IPI), even if multipath propagation is present. Specifically, FIG. 10 illustrates IrDA's FIR mode offering 4 Mb/s data rate with four-slot pulse position modulation (4 PPM, see also FIG. 3a) using $T_s$=125 ns. The pulse modulated input signal A in the example of FIG. 10 is a 4-PPM IrDA signal (FIR mode) which the ETS decoder 42 decodes into the decoded data bit-stream B according to the IrDA specifications. The data encoder 51 maps the decoded data bit-stream B into the recoded data bit-stream C, for example, by means of the simple rate ⅔ parity check code indicated in FIG. 10. Note that this simple code serves for the purpose of illustration and is not necessarily a preferred encoding method. The recoded data bit-stream C is sent to the [UWB] RF generator & modulator 52 whose output provides, for example, a polarity-modulated radio frequency signal D, E. It should noted that the respective polarity assignment of bit "0" and bit "1" in the radio frequency signal D, E indicated in FIG. 10 is only a matter of definition and can thus be exchanged.

Figure 11:
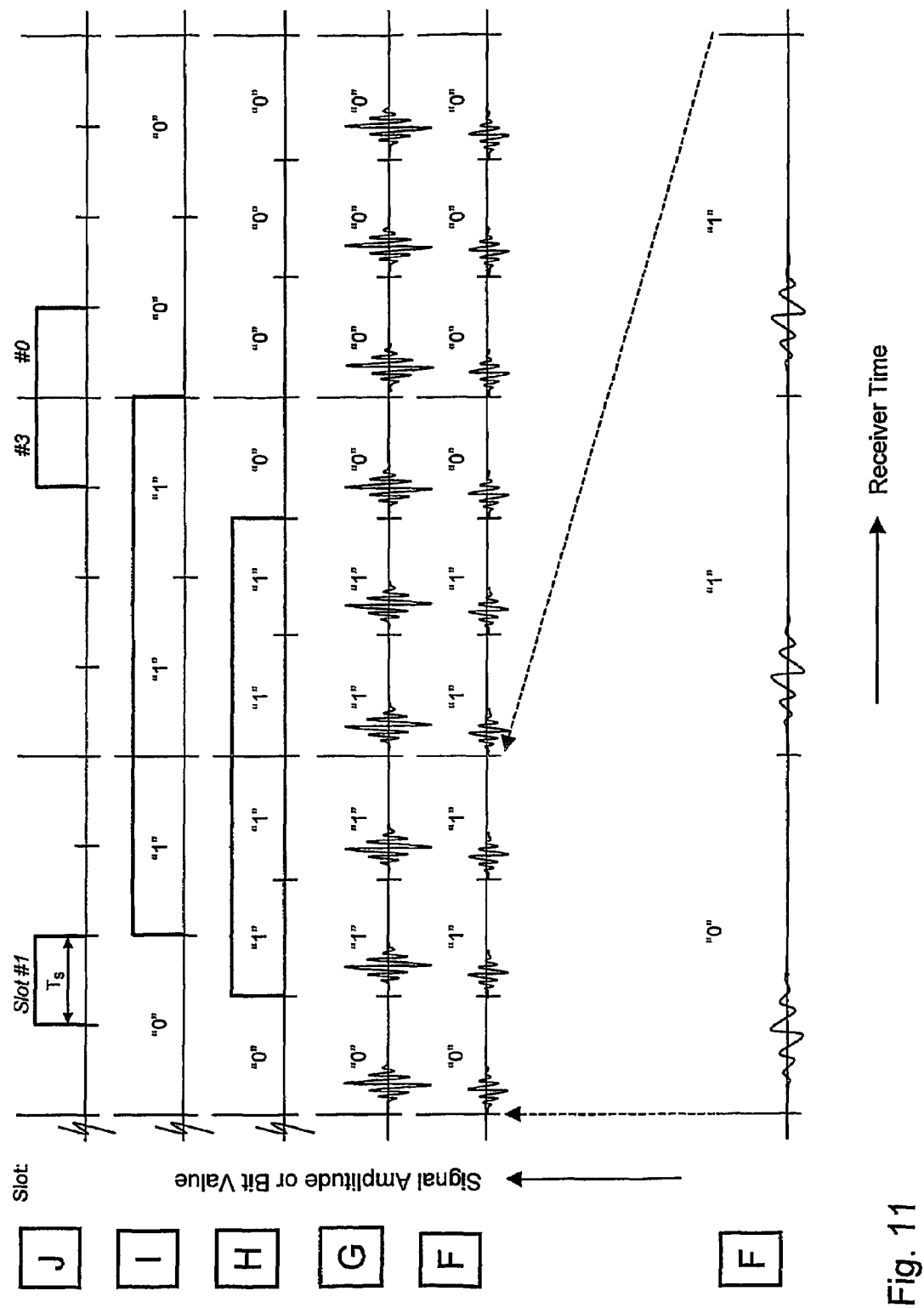
FIG. 11 shows an illustration of typical receiver signals F-J indicated in FIG. 7.

FIG. 11 illustrates typical signal forms, F to I, at the different receiver positions within the RF transverter 4 shown in FIG. 7. Generally, the receiver inverts the different signal path functions introduced by the transmitter. Thus, the received radio frequency signal F, after being amplified by the RF low noise/variable gain amplifier 57 to an amplified received radio frequency signal G, is fed to the demodulator 58 whose output provides the demodulated data bit-stream H. The following data decoder 59 maps the demodulated data bit-stream H to the received data bit-stream I, which is further translated by the ERS encoder 43 into the pulse modulated output signal J; in this example of FIG. 11, the signal form J adheres to IrDA's FIR specification (4-PPM providing a data rate of 4 Mb/s).

The waveforms shown in FIGS. 10 and 11 are examples for the case of IrDA-FIR mode (4 Mb/s). When the IrDA protocol uses lower data rates (cf. e.g., FIG. 3), then $T_s$, the slot or symbol interval as determined by the IrDA system, is longer. In this case, it is proposed to transmit suitable short sequences of pulses within the longer slot interval; this added redundancy will offer advantages in the areas of detection capability and synchronization of the received pulse sequences. For example the sequence "10010110111" could be transmitted for every optical pulse, where a "1" indicates transmission of a single [UWB] RF pulse and a "0" indicates the absence of such a pulse.

A further use and embodiment of the [ultra-wideband (UWB)] radio frequency (RF) transverter 4 is shown in FIG. 12a, where the interface to the optical system is through its native optical interface port, here considered part of the data converter 41. Thus, the latter includes an optical transmitted signal (OTS) receiver and decoder 46 and an optical received signal (ORS) encoder and transmitter 47. Otherwise, this system is similar to the system described with reference to FIG. 7. An apparatus containing this [ultra-wideband (UWB)] radio frequency (RF) transverter 4 is illustrated in FIG. 12b. A wireless converter 7 is based on the [ultra-wideband (UWB)] radio frequency (RF) transverter 4 that connects through an optical interface port (e.g., IrDA compliant) with a host platform 6, for example an IBM "ThinkPad" laptop computer (ThinkPad is a trademark of International Business Machines Corporation in the United States, other countries, or both) or a PDA, comprising an optical transceiver 8, a controller executing the optical link protocol 62, and a host [or client] application 61. The wireless converter 7 and the host platform 6 are equipped with a suitable matching docking system 71, 72 to mechanically connect and secure the relative position of the two units, as well as to block the optical signals used for the optical interface consisting of standard IrDA transceivers 8. The (semi-) transparent windows 91, 92—also denoted optical windows 91, 92—in front of the optically active elements of the IrDA transceivers can be made of different materials. For example, the converter's transparent window 92 can be of material with relatively high optical signal attenuation, such that the optical receiver does not have to operate in the saturation mode, which would be the case because of the short optical link distance without such additional attenuation.

FIG. 13a shows the IrDA communication modes (optical): Sub-SIR, SIR, FIR, and VFIR and FIG. 13b illustrates how the IrDA system could be extended by adding an UWB-RF based mode with the UWB-RF transverter 4. Besides the benefits already listed above, such a system has the added advantage that the requirement for accurately aiming of the communicating devices—as is the case for optical IrDA links—can be avoided, such that handicapped persons could benefit.

Additional features can be built into UWB-RF transverters that will help to implement accurate positioning and location tracking applications. Because of their large bandwidth, UWB signals are inherently suited for this type of application.

For the application shown in FIG. 12b, the necessary DC (direct current) power to drive the RF transverter 4 may be supplied by rechargeable batteries contained in the unit or the host platform 6 may provide the power. Alternatively, energy derived from the optical signal may be converter to an electrical signal that is suited for charging, at least in part, the battery on board of the RF transverter 4.

Any disclosed embodiment may be combined with one or several of the other embodiments shown and/or described. This is also possible for one or more features of the embodiments.

The invention claimed is:

1. A method for converting a pulse modulated input signal (A) to a radio frequency signal (D, E), the method comprising the steps of:
   i.) receiving the pulse modulated input signal (A), wherein the pulse modulated input signal (A) is an optical signal, wherein the pulse modulated input signal (A) is received from an optical controller (1);
   (ii) decoding the received pulse modulated input signal (A) into a decoded data bit-stream (B);
   iv.) modulating a radio frequency signal (D, E) with the decoded data bit-stream (B);

v.) transmitting the modulated radio frequency signal (D, E); and vi.) converting the received pulse modulated input signal (A) to an electrical signal to charge a battery used to operate a transverter.

2. The method according to claim 1, further comprising the step of iii.) encoding the decoded data bit-stream (B) into a recoded data bit-stream (C); and amending the subsequent step to iv.) modulating the radio frequency signal (D, E) with the recoded data bit-stream (B).

3. The method according to claim 2 further for converting a received radio frequency signal (F, G) to a pulse modulated output signal (J) further comprising the steps of:

vi.) demodulating the received radio frequency signal (F, G) into a demodulated data bit-stream (H);

vii.) decoding the demodulated data bit-stream (H) into a received data bit-stream (I);

iix.) encoding the received data bit-stream (I) into the pulse modulated output signal (J); and ix.) forwarding the pulse modulated output signal (J).

4. The method according to claim 1, further comprising amplifying the modulated radio frequency signal (D) to an amplified modulated radio frequency signal (E).

5. The method according to claim 3, wherein the pulse modulated input signal (A) is based on the IrDA specification and the radio frequency signal (D, E) is based on an ultra-wideband (UWB) signal specification and/or the pulse modulated output signal (J) is adapted to the IrDA specification and the received radio frequency signal (F, G) bases on an ultra-wideband (UWB) signal specification.

6. A transverter comprising:
a battery to operate the transverter;
a signal decoder unit for decoding a pulse modulated input signal (A) into a decoded data bit-stream (B);
a data encoder unit for encoding the decoded data bit-streams (B) into a recoded data bit-stream (C);
a radio frequency modulator for modulating a radio frequency signal (D, E) with the decoded data bit-stream (B); wherein the radio frequency modulator is adapted to modulate the radio frequency signal (D, E) with the recoded data bit-stream (C); and
a converter to convert the received pulse modulated input signal to an electrical signal for charging the battery used to operate the transverter.

7. The transverter of claim 6 for further converting a received radio frequency signal (F, G) to a pulse modulated output signal (J), comprising:

a demodulator unit for demodulating the received radio frequency signal (F, G) into a demodulated data bit-stream (H);
a data decoder unit for decoding the demodulated data bit-stream (H) into a received data bit-stream (I); and
a signal encoder unit for encoding the received data bit-stream (I) into the pulse modulated output signal (J).

8. The transverter according to claim 6, comprising a transverter controller.

9. The transverter according to claim 7, comprising a transverter controller.

10. The transverter according to claim 6, comprising an optical transceiver and an optical window which attenuates an optical signal received and/or sent by the optical transceiver.

11. The transverter according to claim 6, comprising an optical transceiver and an optical window which attenuates an optical signal received and/or sent by the optical transceiver.

12. The transverter according to claim 7, comprising an optical transceiver and an optical window which attenuates an optical signal received and/or sent by the optical transceiver.

13. The transverter according to claim 8, comprising an optical transceiver and an optical window which attenuates an optical signal received and/or sent by the optical transceiver.

14. The transverter according to claim 6, being part of a mobile device using the IrDA protocol specification and/or an UWB-RF signal specification.

15. The transverter according to claim 6, being part of a mobile device using the IrDA protocol specification and/or an UWB-RF signal specification.

16. The transverter according to claim 7, being part of a mobile device using the IrDA protocol specification and/or an UWB-RF signal specification.

17. The transverter according to claim 8, being part of a mobile device using the IrDA protocol specification and/or an UWB-RF signal specification.

18. The transverter according to claim 9, being part of a mobile device using the IrDA protocol specification and/or an UWB-RF signal specification.

* * * * *